(12) United States Patent
Horiguchi et al.

(10) Patent No.: US 11,400,918 B2
(45) Date of Patent: Aug. 2, 2022

(54) VEHICLE CONTROL DEVICE

(71) Applicant: SUBARU CORPORATION, Tokyo (JP)

(72) Inventors: Harunobu Horiguchi, Tokyo (JP); Yuta Ishizuka, Tokyo (JP); Makoto Nakauchi, Tokyo (JP); Ryoichi Mizutani, Tokyo (JP); Masaki Sunagawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 181 days.

(21) Appl. No.: 16/741,309

(22) Filed: Jan. 13, 2020

(65) Prior Publication Data

US 2020/0307551 A1  Oct. 1, 2020

(30) Foreign Application Priority Data

Mar. 26, 2019 (JP) .............................. JP2019-058472

(51) Int. Cl.
*B60W 30/02* (2012.01)
*B60T 8/1755* (2006.01)
(Continued)

(52) U.S. Cl.
CPC ......... *B60W 30/02* (2013.01); *B60T 8/17557* (2013.01); *B60W 10/04* (2013.01);
(Continued)

(58) Field of Classification Search
CPC ...... B60W 30/02; B60W 10/04; B60W 10/18; B60W 10/20; B60W 2520/10;
(Continued)

(56) References Cited

U.S. PATENT DOCUMENTS 6,216,079 B1  4/2001  Matsuda
9,428,219 B2 * 8/2016  Flehmig ............... B62D 15/025
(Continued)

FOREIGN PATENT DOCUMENTS

CN     104943742 A  * 9/2015 ............ B60W 10/20
DE  102007000650 B4 * 2/2012 ............. B62D 7/159
(Continued)

OTHER PUBLICATIONS

Machine translation of CN-104943742-A (Year: 2015).*
(Continued)

*Primary Examiner* — Nicholas Kiswanto
*Assistant Examiner* — Mohamad O El Sayah
(74) *Attorney, Agent, or Firm* — McDermott Will & Emery LLP

(57) ABSTRACT

A vehicle control device to be installed in a vehicle includes a self-driving controller and a calculator. The self-driving controller is configured to set a target vehicle speed and a target steering angle to allow the vehicle to trace a predetermined target travel locus. The self-driving controller is configured to control the vehicle based on the target vehicle speed and the target steering angle. The calculator is configured to calculate a deviation between an index of an actual vehicle behavior and an index of a reference vehicle behavior. The self-driving controller corrects one or both of the
(Continued)

target vehicle speed and the target steering angle in accordance with an increase of the deviation, so as to stabilize the vehicle.

13 Claims, 7 Drawing Sheets

(51) Int. Cl.
*B60W 10/04* (2006.01)
*B60W 10/18* (2012.01)
*G05D 1/08* (2006.01)
*G05D 1/02* (2020.01)
*B60W 10/20* (2006.01)

(52) U.S. Cl.
CPC ............ *B60W 10/18* (2013.01); *B60W 10/20* (2013.01); *G05D 1/0223* (2013.01); *G05D 1/0891* (2013.01); *B60W 2520/10* (2013.01); *B60W 2520/14* (2013.01)

(58) Field of Classification Search
CPC ........... B60W 2520/14; B60T 8/17557; G05D 1/0223; G05D 1/0891
See application file for complete search history.

(56) References Cited

U.S. PATENT DOCUMENTS

| | | | |
|---|---|---|---|
| 2013/0158830 A1* | 6/2013 | Kurumisawa | B60K 31/00 701/96 |
| 2017/0313304 A1 | 11/2017 | Shiraishi et al. | |
| 2018/0297638 A1* | 10/2018 | Fujii | B60W 30/12 |
| 2018/0345978 A1* | 12/2018 | Fujii | B62D 15/0255 |
| 2019/0106149 A1* | 4/2019 | Kunihiro | B62D 6/04 |
| 2019/0193694 A1* | 6/2019 | Sunahara | B60T 8/1764 |
| 2020/0172065 A1* | 6/2020 | Watanabe | B60W 30/18145 |

FOREIGN PATENT DOCUMENTS

| | | | | |
|---|---|---|---|---|
| EP | 2261093 A1 * | 12/2010 | | B60T 8/1755 |
| JP | 2000-177616 A | 6/2000 | | |
| JP | 4119020 B2 | 7/2008 | | |
| JP | 6338614 B2 | 6/2018 | | |
| WO | WO 2010050344 A1 * | 5/2010 | | B60W 40/072 |

OTHER PUBLICATIONS

Machine translation of DE-102007000650-B4 (Year: 2012).*
Machine translation of EP-2261093-A1 (Year: 2010).*
Machine translation of WO 2010050344 A1 (Year: 2010).*

* cited by examiner

VEHICLE CONTROL DEVICE

CROSS-REFERENCE TO RELATED APPLICATIONS

The present application claims priority from Japanese Patent Application No. 2019-058472 filed on Mar. 26, 2019, the entire contents of which are hereby incorporated by reference.

BACKGROUND

The disclosure relates to a vehicle control device that controls a vehicle such as an automobile having a self-driving function.

A behavior control device provided in a vehicle such as an automobile compares an actual yaw rate of a host vehicle with a model yaw rate which can be obtained when a vehicle state is stable. When an amount of a deviation between the actual yaw rate and the model yaw rate exceeds a predetermined control intervention threshold, the behavior control device generates, for example, a difference in braking or driving force between a turning outer wheel and a turning inner wheel, so that a yaw moment to prevent an oversteer behavior or an understeer behavior is generated to stabilize a vehicle behavior.

Japanese Patent No. 6338614 relates to such a behavior control device. Japanese Patent No. 6338614 discloses a device that predicts, in a self-driving state, oversteer or understeer by detecting an unstable behavior in a roll direction and a yaw direction of a host vehicle. The device executes at least one of correcting a steering angle or applying a braking force to a predetermined wheel. Thereby, the unstable behavior of the host vehicle is prevented such that a deviation from a target yaw rate is equal to or less than a threshold.

Japanese Unexamined Patent Application Publication (JP-A) No. 2000-177616 discloses a device for assisting travelling of a vehicle in an emergency state. The device improves avoidance performance of a vehicle in the emergency state. The device calculates and determines (i) an oversteer trend based on a spin degree and (ii) an understeer trend based on a drift degree. In a normal state, the device performs control using a normal spin degree threshold and a normal drift degree threshold. In the emergency state, the device uses values obtained by subtraction from a normal predetermined value to facilitate the control to intervene.

Japanese Patent No. 4119020 discloses detecting an understeer state or an oversteer state by calculating a deviation between an actual motion state of a host vehicle and a reference motion state, controlling a brake actuator according to an operation amount calculated based on the deviation, and generating a difference between a left braking force and a right braking force of the host vehicle, so that a yaw moment is generated to eliminate the understeer state or the oversteer state.

Japanese Patent No. 4119020 also discloses predicting a travel direction of the host vehicle based on an actual sideslip angle and an actual yaw rate, and correcting the operation amount based on a correction amount corresponding to a deviation between the predicted travel direction of the host vehicle and a direction of a road ahead of the host vehicle.

SUMMARY

An aspect of the disclosure provides a vehicle control device to be installed in a vehicle. The device includes a self-driving controller and a calculator. The self-driving controller is configured to set a target vehicle speed and a target steering angle to allow the vehicle to trace a predetermined target travel locus. The self-driving controller is configured to control the vehicle based on the target vehicle speed and the target steering angle. The calculator is configured to calculate a deviation between an index of an actual vehicle behavior and an index of a reference vehicle behavior. The self-driving controller corrects one or both of the target vehicle speed and the target steering angle in accordance with an increase of the deviation, so as to stabilize the vehicle.

An aspect of the disclosure provides a vehicle control device to be installed in a vehicle. The device includes a self-driving controller, a predictor, and a calculator. The self-driving controller is configured to set a target vehicle speed and a target steering angle to allow the vehicle to trace a predetermined target travel locus. The self-driving controller is control the vehicle based on the target vehicle speed and the target steering angle. The predictor is configured to predict a vehicle behavior. The calculator is configured to calculate a deviation between an index of the predicted vehicle behavior and an index of a reference vehicle behavior. The self-driving controller corrects one or both of the target vehicle speed and the target steering angle in accordance with an increase of the deviation, so as to stabilize the vehicle.

An aspect of the disclosure provides a vehicle control device to be installed in a vehicle. The device includes circuitry. The circuitry is configured to set a target vehicle speed and a target steering angle to allow the vehicle to trace a predetermined target travel locus. The circuitry is configured to control the vehicle based on the target vehicle speed and the target steering angle. The circuitry is configured to calculate a deviation between an index of an actual vehicle behavior and an index of a reference vehicle behavior. The circuitry corrects one or both of the target vehicle speed and the target steering angle in accordance with an increase of the deviation, so as to stabilize the vehicle.

An aspect of the disclosure provides a vehicle control device to be installed in a vehicle. The device includes circuitry. The circuitry is configured to set a target vehicle speed and a target steering angle to allow the vehicle to trace a predetermined target travel locus. The circuitry is control the vehicle based on the target vehicle speed and the target steering angle. The circuitry is configured to predict a vehicle behavior. The circuitry is configured to calculate a deviation between an index of the predicted vehicle behavior and an index of a reference vehicle behavior. The circuitry corrects one or both of the target vehicle speed and the target steering angle in accordance with an increase of the deviation, so as to stabilize the vehicle.

DETAILED DESCRIPTION

An oversteer behavior or an understeer behavior occurs in a self-driving vehicle, and behavior stabilization control intervenes. In such a case, when a self-driving instruction value (for example, a target vehicle speed and a target steering angle) before the behavior stabilization control intervention continues to be the same after the oversteer behavior or the understeer behavior is restored and the vehicle is stabilized, the vehicle may become unstable again, the behavior stabilization control intervenes repeatedly, and a user such as a passenger may feel unsafe or become distrustful. There is room for improvement in these respects.

It is desirable to provide a vehicle control device that prevents a vehicle behavior from continuing to be in an unstable state during self-driving.

First Embodiment

Hereinafter, a vehicle control device according to a first embodiment of the disclosure will be described.

The vehicle control device according to the first embodiment is provided in an automobile such as a passenger car having a self-driving function.

Figure 1:
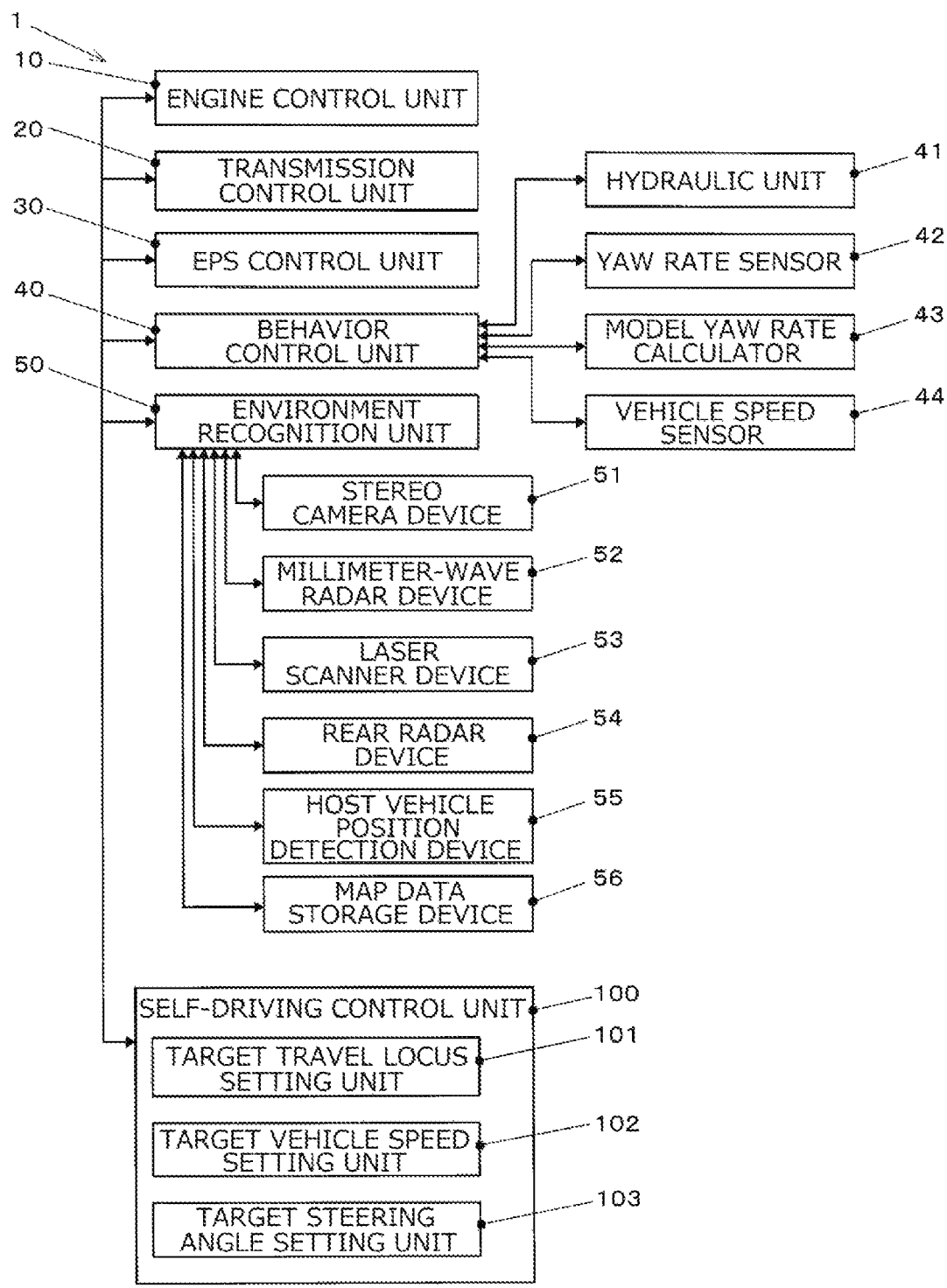
FIG. 1 is a block diagram illustrating a configuration of a vehicle including a vehicle control device according to a first embodiment of the disclosure.

FIG. 1 is a block diagram illustrating a configuration of a vehicle including the vehicle control device according to the first embodiment.

A vehicle control device 1 includes an engine control unit 10, a transmission control unit 20, an electric power steering (EPS) control unit 30, a behavior control unit 40, an environment recognition unit 50, and a self-driving control unit 100.

Each of these units includes an information processor such as a CPU, a storage such as a RAM and a ROM, an input and output interface, and a bus that connects these elements.

The units may communicate with each other directly or via an in-vehicle LAN system.

The engine control unit 10 collectively controls an engine that is a power source used for driving the vehicle, and auxiliary devices of the engine.

The engine may be, for example, a gasoline direct injection turbocharged engine.

The engine control unit 10 may adjust an output of the engine by controlling, for example, a throttle valve opening degree of the engine, a fuel injection amount and a fuel injection timing, an ignition timing, an intake and exhaust valve timing, supercharging pressure, an EGR rate, and a state of a tumble control valve.

When the vehicle is driven by a driver (during manual driving), the engine control unit 10 controls the engine output such that an actual torque matches a requested torque that is set based on an amount of a driver's operation of an accelerator pedal.

During self-driving, the engine control unit 10 controls the engine output such that an actual torque matches a requested torque that is set based on a target vehicle speed.

The target vehicle speed is set by a target vehicle speed setting unit 102 in the self-driving control unit 100.

The transmission control unit 20 collectively controls a transmission (not illustrated) that changes speed of rotation of an output shaft of the engine and auxiliary devices of the transmission.

The transmission may be, for example, a chain continuously variable transmission (CVT) including a torque converter with a lock-up clutch in a start device.

The transmission control unit 20 appropriately controls a transmission gear ratio of a variator, and a restraining force of the lock-up clutch according to a traveling state of the vehicle.

The electric power steering control unit 30 collectively controls an electric power steering device and auxiliary devices of the electric power steering device. The electric power steering device applies a force in a steering direction (rack thrust) by an electric actuator such as a motor to a steering device that steers front wheels which are steering wheels of the vehicle.

During manual driving of the vehicle, the electric power steering control unit 30 generates an assist force to perform assist control of reducing a steering operating force and a steering retention force based on an output of a torque sensor provided on a steering shaft.

During self-driving, the electric power steering control unit 30 controls the electric power steering device such that an actual steering angle matches a target steering angle set by a target steering angle setting unit 103 in the self-driving control unit 100.

When either an oversteer behavior and an understeer behavior which are an unstable state of the vehicle occurs, the behavior control unit 40 performs behavior stabilization control to generate a yaw moment to prevent the oversteer behavior or the understeer behavior, and performs anti-lock brake control to prevent a brake lock during braking by periodically reducing hydraulic pressure of a brake fluid.

The behavior control unit 40 is coupled to a hydraulic unit 41, a yaw rate sensor 42, a model yaw rate calculator 43, and a vehicle speed sensor 44.

The hydraulic unit 41 individually controls wheel cylinder hydraulic pressure in a vehicle hydraulic service brake on a wheel basis.

The hydraulic unit 41 includes an electric pump that pressurizes a brake fluid, a pressurizing control valve that controls hydraulic pressure in each wheel cylinder, a holding valve, a pressure reduction valve, and the like.

The yaw rate sensor 42 detects an actual yaw rate of the vehicle body. The actual yaw rate is a rotational speed around a vertical axis of the vehicle body.

In one embodiment, the actual yaw rate may serve as an "index of an actual vehicle behavior".

The model yaw rate calculator 43 calculates a model yaw rate that is a yaw rate which can be generated when the vehicle is stable in a current driving state (such as a vehicle speed and a steering angle) of the host vehicle.

In one embodiment, the model yaw rate may serve as an "index of a reference vehicle behavior".

For example, when a deviation between the actual yaw rate and the model yaw rate is large, it may be determined that the vehicle is in an unstable state.

When an absolute value of the actual yaw rate is larger than an absolute value of the model yaw rate by a predetermined value or more, an oversteer behavior occurs. When the absolute value of the model yaw rate is larger than the absolute value of the actual yaw rate by a predetermined value or more, an understeer behavior occurs.

In one embodiment, the behavior control unit 40 may serve as a "calculator".

The vehicle speed sensor 44 is provided on each wheel and generates a vehicle speed signal having a frequency proportional to a rotational speed of the each wheel.

The behavior control unit 40 may calculate a rotational speed of the wheel based on an output signal from the vehicle speed sensor 44. The rotational speed of the wheel is equivalent to the traveling speed of the vehicle when neither wheel locking nor wheel spinning occurs.

The environment recognition unit 50 recognizes information on environment around the host vehicle.

Here, examples of the environment around the host vehicle include a road on which the host vehicle is travelling, a three-dimensional shape of an obstacle such as geography, buildings, pedestrians, and other vehicles that are travelling or stop.

The environment recognition unit 50 is coupled to a stereo camera device 51, a millimeter-wave radar device 52, a laser scanner device 53, a rear radar device 54, a host vehicle position detection device 55, and a map data storage device 56.

The stereo camera device 51 includes a pair of imaging devices (cameras) whose imaging range is a range in front of the host vehicle. The pair of imaging devices are separated by a predetermined base line length in a vehicle width direction. The stereo camera device 51 performs known stereo image processing on images captured by the cameras to thereby recognize a relative distance and an orientation of a captured object to the host vehicle based on a parallax between the cameras.

The stereo camera device 51 may detect an obstacle such as another vehicle, and detect a lane shape by recognizing a lane boundary line (such as a lane line).

The stereo camera device 51 recognizes an attribute of an object by image processing using the captured images. Examples of the attribute of the object include a vehicle, a pedestrian, geography, and a building.

The millimeter-wave radar device 52 is, for example, a radar of high accuracy and high viewing angle using a high frequency radio wave in such as 79 GHz band.

The millimeter-wave radar device 52 may detect a relative speed of an obstacle to the host vehicle and using the Doppler effect, in addition to a relative position of the obstacle to the host vehicle.

The millimeter-wave radar device 52 detects an obstacle mainly ahead of the host vehicle in cooperation with the stereo camera device 51.

The laser scanner device 53 emits infrared radar in a pulse manner while changing an emission direction, to measure a position and a distance of an obstacle using reflected waves.

The rear radar device 54 detects an obstacle such as other vehicles in rear of and in rear leftward and rightward of the host vehicle, using, for example, a submillimeter-wave radar.

The host vehicle position detection device 55 is a positioning device that detects a position of the host vehicle using, for example, a GPS.

The map data storage device 56 includes a storage medium that stores, as a database, dynamic map data in which data about road conditions and weather conditions are integrated in high accuracy 3D map data.

The map data storage device 56 may sequentially update the stored data via a communication device (not illustrated).

In order to autonomously drive the host vehicle to a destination set by a user, the self-driving control unit 100 sequentially generates a self-driving scenario including a target travel locus and a target vehicle speed by referring to information from the environment recognition unit 50, cooperatively controls the engine control unit 10, the transmission control unit 20, and the electric power steering control unit 30 based on the self-driving scenario, and performs self-driving control to allow the host vehicle to be automatically driven.

The self-driving control unit 100 includes a target travel locus setting unit 101, a target vehicle speed setting unit 102, and a target steering angle setting unit 103.

The target travel locus setting unit 101 sets a target travel locus through which the host vehicle is to pass based on the environment around the vehicle acquired by the environment recognition unit 50.

The target travel locus may be set, for example, to extend along a center in a width direction of a traveling lane of the host vehicle.

The target vehicle speed setting unit 102 and the target steering angle setting unit 103 set a target vehicle speed and a target steering angle for the vehicle to trace the target travel locus set by the target travel locus setting unit 101.

Generally, when the target travel locus is, for example, a curve having constant curvature and the target vehicle speed is set, a target steering angle is uniquely determined to allow the vehicle to trace the target travel locus at the target vehicle speed.

Next, operation of the vehicle control device according to the first embodiment will be described.

When the behavior stabilization control intervenes during self-driving, the vehicle control device according to the first embodiment corrects the target vehicle speed and the target steering angle that are used in self-driving after the vehicle is stabilized (after the behavior stabilization control is completed), so as to stabilize the vehicle.

Figure 2:
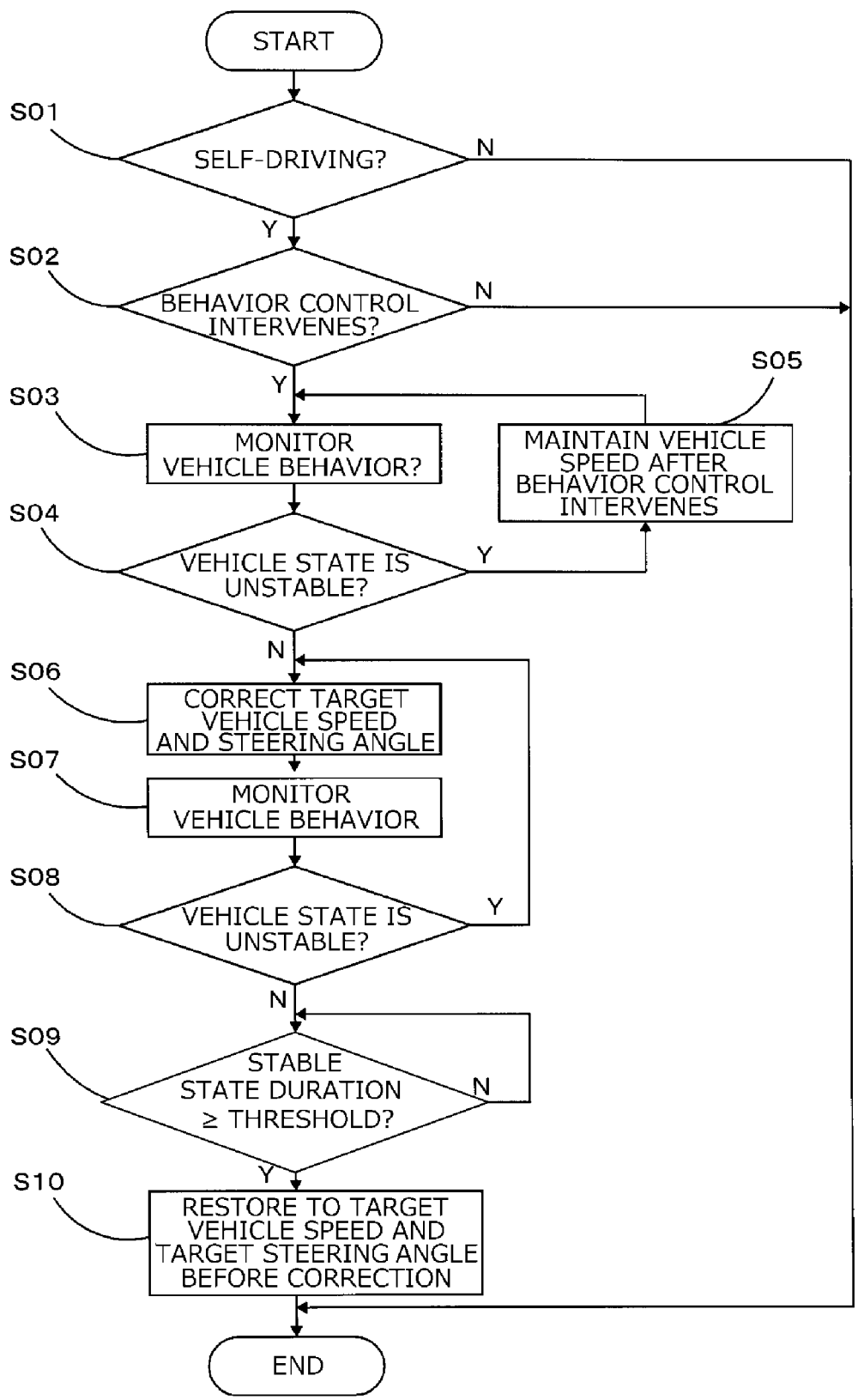
FIG. 2 is a flowchart illustrating operation of the vehicle control device according to the first embodiment.

FIG. 2 is a flowchart illustrating the operation of the vehicle control device according to the first embodiment.

Hereinafter, steps will be sequentially described.

(Step S01: Determine Self-Driving)

The self-driving control unit 100 determines whether the host vehicle is currently driven under self-driving control.

When the vehicle is currently driven under the self-driving control, the vehicle control device 1 proceeds to step S02, otherwise ends a series of processes (that is, returns).

(Step S02: Determine Intervention of Behavior Control)

The behavior control unit 40 determines whether the deviation between the actual yaw rate of the vehicle detected by the yaw rate sensor 42 and the model yaw rate calculated by the model yaw rate calculator 43 is equal to or larger than a predetermined intervention threshold and behavior stabilization control intervenes.

When the behavior stabilization control intervenes, the vehicle control device 1 proceeds to step S03, otherwise ends the series of processes (that is, returns).

(Step S03: Monitor Vehicle Behavior)

When the vehicle is in an oversteer state, the behavior control unit 40 performs the behavior stabilization control to generate a braking force on a turning outer wheel. When the vehicle is in an understeer state, the behavior control unit 40 performs the behavior stabilization control to generate a braking force on a turning inner wheel.

The behavior control unit 40 acquires the actual yaw rate and the model yaw rate after the behavior stabilization control intervenes, from the yaw rate sensor 42 and the model yaw rate calculator 43, and monitors vehicle behavior.

Thereafter, the vehicle control device 1 proceeds to step S04.

(Step S04: Determine Vehicle State)

The behavior control unit 40 determines whether a vehicle state is a stable state or an unstable state.

Specifically, when a state in which a difference between the actual yaw rate and the model yaw rate is equal to or less than a predetermined threshold (stabilization determination threshold) continues for a predetermined time or more, the behavior control unit 40 determines that the vehicle state is a stable state. An absolute value of the stabilization determination threshold is less than an intervention threshold for the behavior stabilization control.

When the vehicle state is an unstable state, the vehicle control device 1 proceeds to step S05. When the vehicle state is a stable state, the vehicle control device 1 proceeds to step S06.

(Step S05: Maintain Vehicle Speed after Behavior Stabilization Control Intervenes)

The self-driving control unit 100 maintains the vehicle speed of the host vehicle at a vehicle speed after the behavior stabilization control intervenes by the behavior control unit 40.

During the behavior stabilization control, the vehicle speed is reduced relative to the target vehicle speed by using a braking force to generate a yaw moment and reducing an engine output.

Thereafter, the vehicle control device 1 returns to step S03 and repeats subsequent processes.

(Step S06: Correct Target Vehicle Speed and Steering Angle)

The target vehicle speed setting unit 102 in the self-driving control unit 100 performs correction to reduce the target vehicle speed by a predetermined value relative to a previous value so as to further stabilize the vehicle during self-driving.

With the reduced target vehicle speed, a steering angle used to trace a target travel locus set by the target travel locus setting unit 101 also changes.

In general, since the vehicle has a slight understeering trend, the target steering angle is also reduced when the target vehicle speed is reduced.

The target steering angle setting unit 103 corrects the target steering angle in such a manner.

Table 1 illustrates outline of the correction of the target vehicle speed and target steering angle.

As illustrated in Table 1, the target vehicle speed and the target steering angle are corrected based on (i) an amount of a deviation obtained by subtracting the model yaw rate from the actual yaw rate, (ii) a trend of an increase or a decrease in the deviation, and (iii) whether an oversteer behavior occurs or an understeer behavior occurs.

For example, when the oversteer behavior occurs and the deviation increases (that is, the deviation changes such that the oversteer becomes worse) the target vehicle speed and the target steering angle are both decreased when the deviation is large or the deviation increases rapidly.

On the other hand, even when the oversteer behavior occurs, the target vehicle speed and the target steering angle are maintained when the deviation is small and the deviation increases slowly.

When the oversteer behavior occurs and the deviation decreases (that is, the deviation changes such that the vehicle restores from the oversteer), the target vehicle speed and the target steering angle are maintained such that the behavior tends to be settled appropriately when the deviation is large and the deviation decreases rapidly or when the deviation is small and the deviation decreases slowly.

On the other hand, when the oversteer behavior occurs and the deviation decreases, the target vehicle speed and the target steering angle are both decreased to settle the oversteer behavior in an early stage when the deviation is large and the deviation decreases slowly.

When the oversteer behavior occurs and the deviation decreases, the target vehicle speed and the target steering angle are both decreased to prevent the vehicle from changing to the understeer behavior immediately after the oversteer behavior is settled when the deviation is small and the deviation decreases rapidly.

When the understeer behavior occurs and the deviation decreases (that is, the deviation changes such that the understeer behavior becomes worse), the target vehicle speed and the target steering angle are both decreased when the deviation is large or the deviation decreases rapidly.

On the other hand, even when the understeer behavior occurs, the target vehicle speed and the target steering angle are maintained when the deviation is small and the deviation decreases slowly.

TABLE 1

| | | | Gradient of Deviation | | | |
|---|---|---|---|---|---|---|
| | | | Increasing Gradient | | Decreasing Gradient | |
| | | | Large | Small | Large | Small |
| Deviation | Oversteer Intervention Side | Large | Decrease speed Decrease steering angle | Decrease speed Decrease steering angle | Maintain vehicle speed Maintain steering angle | Decrease speed Decrease steering angle |
| | | Small | Decrease speed Decrease steering angle | Maintain vehicle speed Maintain steering angle | Decrease speed Decrease steering angle | Maintain vehicle speed Maintain steering angle |
| | Understeer Intervention Side | Large | Maintain vehicle speed Maintain steering angle | Decrease speed Decrease steering angle | Decrease speed Decrease steering angle | Decrease speed Decrease steering angle |
| | | Small | Decrease speed Decrease steering angle | Maintain vehicle speed Maintain steering angle | Decrease speed Decrease steering angle | Maintain vehicle speed Maintain steering angle |

When the understeer behavior occurs and the deviation increases (that is, the deviation changes such that the vehicle restores from the understeer), the target vehicle speed and the target steering angle are maintained such that the behavior tends to be settled appropriately when the deviation is large and the deviation increases rapidly or when the deviation is small and the deviation increases slowly.

On the other hand, when the understeer behavior occurs and the deviation increases, the target vehicle speed and the target steering angle are both decreased to settle the behavior in an early stage when the deviation is large and the deviation increases slowly.

When the oversteer behavior occurs and the deviation increases, the target vehicle speed and the target steering angle are both decreased to prevent the vehicle from changing to the understeer behavior immediately after the oversteer behavior is settled when the deviation is small and the deviation increase rapidly.

The vehicle control device 1 proceeds to step S07 after the above correction is performed.

(Step S07: Monitor Vehicle Behavior)

The behavior control unit 40 monitors the vehicle behavior after the target vehicle speed and the target steering angle are corrected.

Thereafter, the vehicle control device 1 proceeds to step S08.

(Step S08: Determine Vehicle State)

The behavior control unit 40 determines whether a vehicle state is a stable state or an unstable state.

When the deviation obtained by subtracting the model yaw rate from the actual yaw rate is equal to or less than the predetermined stabilization determination threshold, the behavior control unit 40 determines that the vehicle state is the stable state.

When the vehicle state is the unstable state, the vehicle control device 1 returns to step S06 and repeats the subsequent processes. When the vehicle state is the stable state, the vehicle control device 1 proceeds to step S09.

(Step S09: Determine Stable State Duration)

The behavior control unit 40 measures duration in which the vehicle state is the stable state by a timer (not illustrated), and compares the duration with a preset threshold.

When the duration in which the vehicle state is the stable state is equal to or larger than the threshold, the vehicle control device proceeds to step S10, otherwise repeats step S09.

(Step S10: Restore to Target Vehicle Speed and Target Steering Angle before Correction)

The self-driving control unit 100 restores the target vehicle speed and the target steering angle that are corrected in step S06 to values before the correction.

Accordingly, the self-driving control unit 100 increases the vehicle speed and changes the steering angle in accordance with the increase of the vehicle speed. Change rates (change speeds) per unit time of the vehicle speed and the steering angle at this time are set to be lower than normal change rates during self-driving.

Thereafter, the vehicle control device 1 ends the process.

Next, effects of the first embodiment will be described in comparison with a comparative example of the disclosure described below.

In the following description on the comparative example and embodiments, the same components as those in the first embodiment are denoted by the same reference numerals. Description on those components may be omitted. Differences will be mainly described.

A vehicle control device according to the comparative example restores a target vehicle speed and a target steering angle to original set values (without performing correction) immediately after the behavior stabilization control intervenes during self-driving and the vehicle is stabilized.

Figure 3:
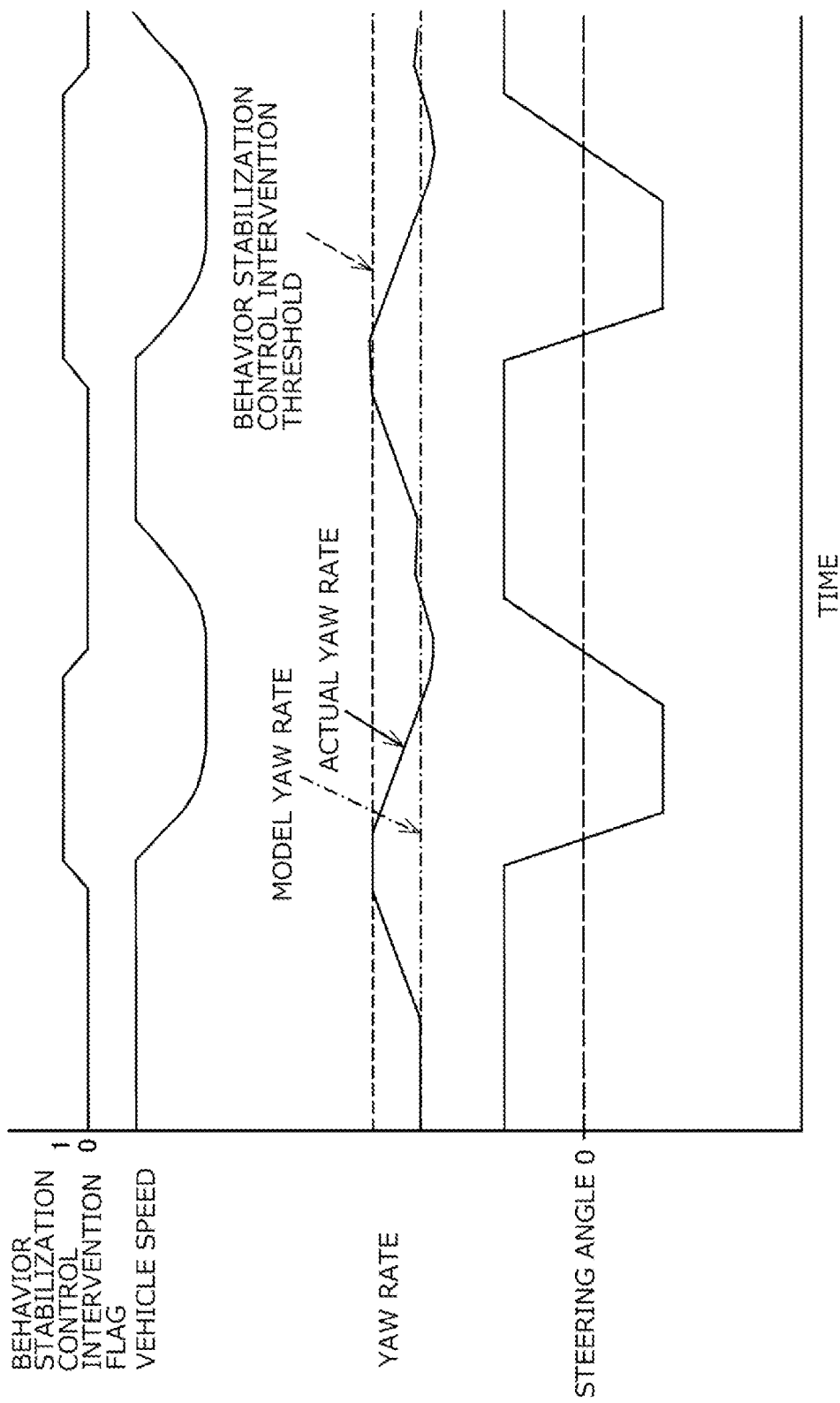
FIG. 3 is a diagram illustrating an example of transition of a vehicle state in a vehicle including a vehicle control device of a comparative example of the disclosure.

FIG. 3 is a diagram illustrating an example of transition of a vehicle state in a vehicle including the vehicle control device of the comparative example of the disclosure.

In FIG. 3, the horizontal axis represents time, and the vertical axis represents a behavior stabilization control intervention flag (1 represents intervening, 0 represents no intervening), a vehicle speed (an upper part indicates a higher speed), a yaw rate (an upper part indicates a larger absolute value), and a steering angle (an upper parts indicates steering to a turning inner wheel side). (The same applies to FIG. 4 which will be described later.)

FIG. 3 illustrates an example (similar to FIG. 4) in which the vehicle is driven, for example, along an arc-shaped curved road having constant curvature.

When the vehicle speed is constant (that is, the vehicle is at the target vehicle speed) along such a curved road having the constant curvature, the yaw rate and the steering angle are constant if the vehicle is in a stable state.

A model yaw rate indicated by a dash-dot line in FIG. 3 represents such a yaw rate.

In the example illustrated in FIG. 3, an oversteer behavior occurs in the vehicle, and an actual yaw rate indicated by a solid line deviates so as to become larger than the model yaw rate.

Thereafter, when the deviation between the actual yaw rate and the model yaw rate reaches a behavior stabilization control intervention threshold indicated by a dotted line, the behavior control unit 40 cause the behavior stabilization control to intervene to reduce an engine output and generate a yaw moment to prevent the oversteer behavior by generating a braking force on wheels at a turning outer wheel side.

The self-driving control unit 100 performs counter steering by controlling the steering angle such that the vehicle traces a target travel locus, and restores the behavior and the travel locus.

Here, when the actual yaw rate converges to the model yaw rate and the behavior stabilization control is completed in the comparative example, the self-driving control unit 100 immediately restores the target vehicle speed and the target steering angle to original values before the behavior stabilization control intervenes.

However, as a result, the oversteer behavior occurs again immediately after the restoration and the behavior stabilization control intervenes.

In this manner, when the behavior stabilization control frequently intervenes, a passenger may feel unsafe or become distrustful of travel safety of the vehicle.

Figure 4:
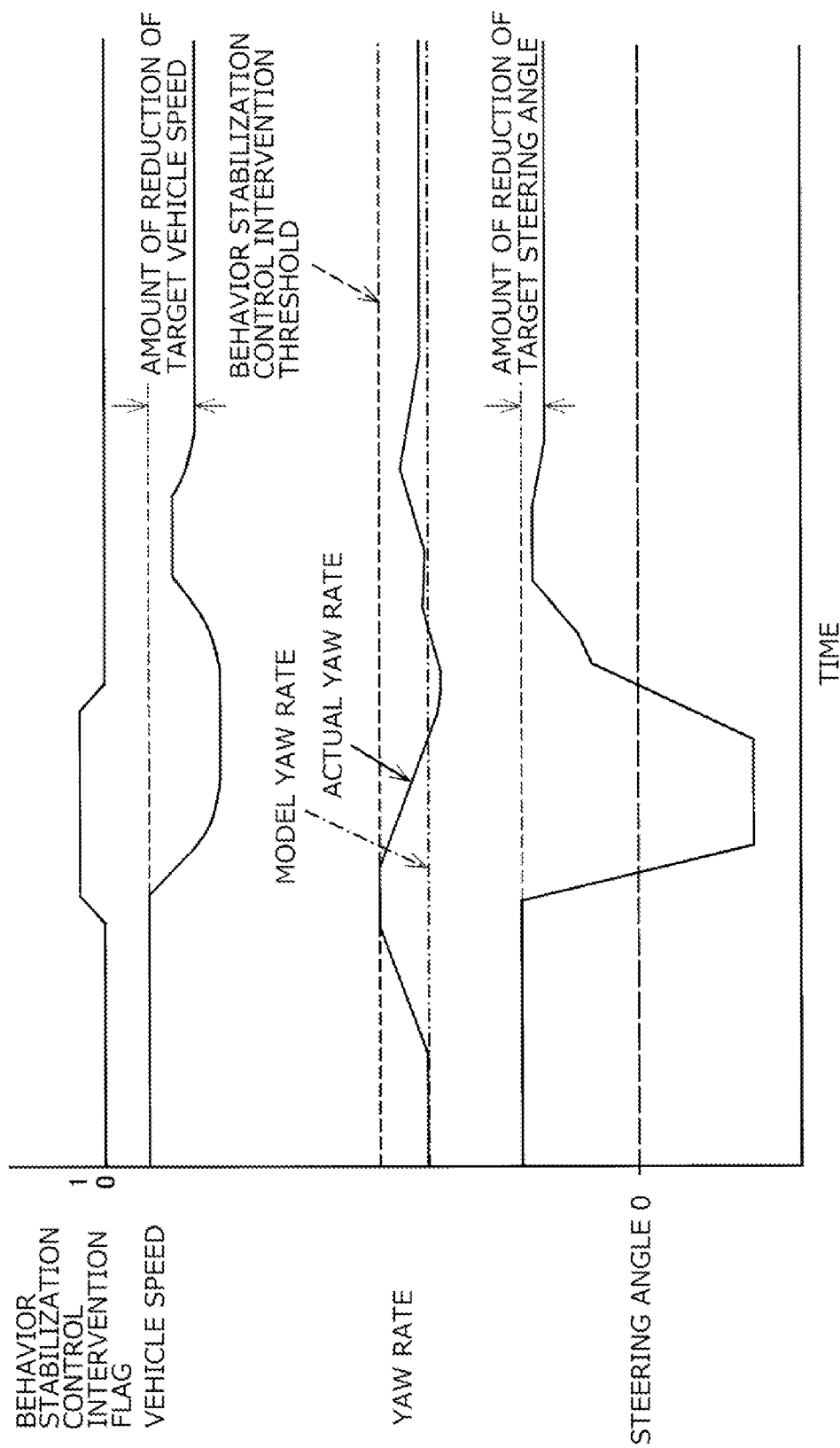
FIG. 4 is a diagram illustrating an example of transition of a vehicle state in the vehicle including the vehicle control device according to the first embodiment.

FIG. 4 is a diagram illustrating an example of transition of a vehicle state in the vehicle including the vehicle control device according to the first embodiment.

In the first embodiment, when the oversteer behavior occurs, the behavior stabilization control intervenes so as to set the vehicle to be in a stable state. Thereafter, the vehicle behavior is monitored, and when it is determined that the vehicle is in an unstable state, a correction is performed to reduce the target vehicle speed and the target steering angle.

As a result, the actual yaw rate roughly converges to the model yaw rate, and the behavior stabilization control is prevented from intervening plural times.

As described above, the first embodiment provides the following effects.

(1) When the deviation between the actual yaw rate which is an index of an actual vehicle behavior and the model yaw rate which is an index of a reference vehicle behavior increases and it is recognized that the vehicle is in an unstable state, the vehicle behavior can be prevented from continuing to be in an unstable state by correcting the target vehicle speed and the target steering angle during self-driving so as to reduce the target vehicle speed and the target steering angle, to thereby stabilize the vehicle.

(2) The disclosure is easily applicable to existing vehicles without adding new hardware, by using the actual yaw rate and the model yaw rate which are parameters often used in behavior control devices provided in common vehicles.

(3) The target vehicle speed and the target steering angle are corrected after the behavior stabilization control intervenes. Accordingly, a passenger can recognize a possibility that the vehicle behavior would be unstable when no correction is performed.

(4) When the duration in which the vehicle is in a stable state is equal to or larger than a threshold, the vehicle speed and the like under self-driving control can be restored by completing the correction on the target vehicle speed and the target steering angle, and convenience of the vehicle can be improved.

(5) When the target vehicle speed and the target steering angle are restored to original values after the correction, acceleration at this time is slow relative to normal self-driving, so that the vehicle can be prevented from being unstable again due to the acceleration and the passenger can be prevented from feeling unsafe.

Second Embodiment

Next, a vehicle control device according to a second embodiment of the disclosure will be described.

When it is determined that a result of monitoring a vehicle behavior indicates that the vehicle behavior is in an unstable state, a vehicle control device according to the second embodiment corrects a target vehicle speed and a target steering angle even when no behavior stabilization control intervenes.

Figure 5:
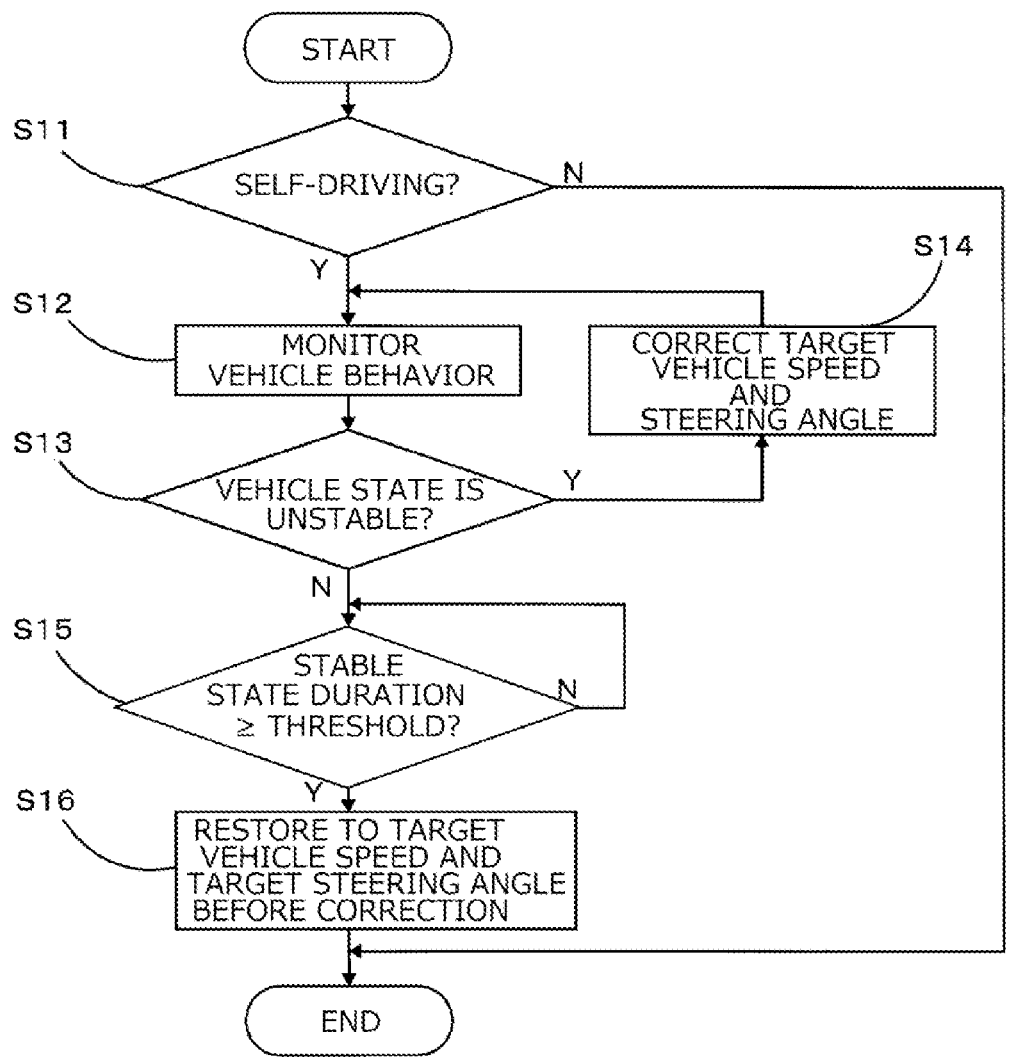
FIG. 5 is a flowchart illustrating operation of a vehicle control device according to a second embodiment of the disclosure.

FIG. 5 is a flowchart illustrating operation of the vehicle control device according to the second embodiment.

Hereinafter, steps will be sequentially described.
(Step S11: Determine Self-Driving)

The self-driving control unit 100 determines whether the host vehicle is currently driven under self-driving control.

When the vehicle is currently driven under the self-driving control, the vehicle control device 1 proceeds to step S12, otherwise ends a series of processing (that is, returns).
(Step S12: Monitor Vehicle Behavior)

The behavior control unit 40 acquires a current actual yaw rate and a model yaw rate, and monitors a vehicle behavior.

Thereafter, the vehicle control device 1 proceeds to step S13.
(Step S13: Determine Vehicle State)

The behavior control unit 40 determines whether a vehicle state is a stable state or an unstable state.

When the vehicle state is an unstable state, the vehicle control device 1 proceeds to step S14. When the vehicle state is a stable state, the vehicle control device 1 proceeds to step S13.
(Step S14: Correct Target Vehicle Speed and Steering Angle)

The target vehicle speed setting unit 102 in the self-driving control unit 100 performs correction to reduce the target vehicle speed by a predetermined value relative to a previous value so as to further stabilize the vehicle during self-driving.

Thereafter, the vehicle control device 1 returns to step S12 and repeats the subsequent processes.
(Step S15: Determine Stable State Duration)

The behavior control unit 40 measure duration in which the vehicle state is the stable state, and compares the duration with a preset threshold.

When the stable state duration is equal to or larger than the threshold, the vehicle control device 1 proceeds to step S16, otherwise repeats step S15.
(Step S16: Restore to Target Vehicle Speed and Target Steering Angle before Correction)

When the target vehicle speed and the target steering angle are corrected in step S14, the self-driving control unit 100 restores the target vehicle speed and the target steering angle to values before correction.

Thereafter, the vehicle control device 1 ends the process.

In addition to similar effects of the first embodiment (except the effect described in the item (3)), in the second embodiment, the target vehicle speed or the like is corrected even before the behavior stabilization control intervenes, so that behavior disturbance can be prevented in advance to achieve the vehicle traveling stability.

Third Embodiment

Next, a vehicle control device according to a third embodiment of the disclosure will be described.

The vehicle control device according to the third embodiment predicts a vehicle behavior by a numerical analysis using a vehicle model. When it is predicted that the vehicle behavior will be in an unstable state, a target vehicle speed and a target steering angle during self-driving are corrected even when neither actual oversteer behavior nor understeer behavior occurs.

Figure 6:
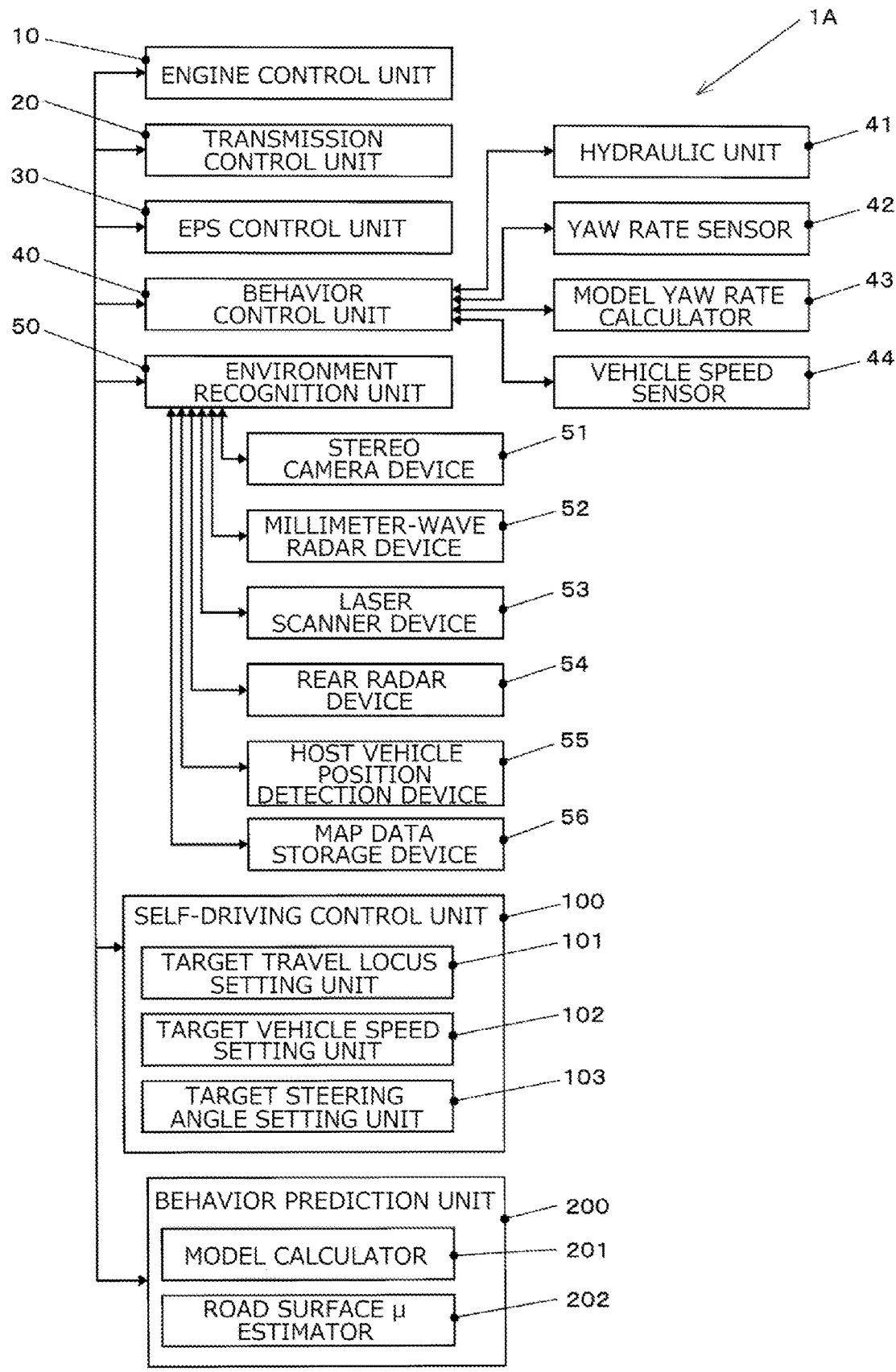
FIG. 6 is a block diagram illustrating a configuration of a vehicle including a vehicle control device according to a third embodiment of the disclosure.

FIG. 6 is a block diagram illustrating a configuration of a vehicle including the vehicle control device according to the third embodiment.

A vehicle control device 1A according to the third embodiment includes a behavior prediction unit 200 in addition to the vehicle control device 1 according to the first embodiment.

The behavior prediction unit 200 includes a model calculator 201 and a road surface friction coefficient estimator 202. Hereinafter, the term "friction coefficient" may be simply referred to as "μ".

The model calculator 201 uses a known vehicle motion model to predict a behavior that a host vehicle may have in the future based on (i) a lane shape of a road that the host vehicle will pass in the future and (ii) a road surface friction coefficient (μ) estimated by the road surface μ estimator 202 by a numerical analysis simulation. The lane shape of the road that the host vehicle will pass in the future is recognized by the environment recognition unit 50.

The road surface μ estimator 202 estimates a friction coefficient of a road surface on which the host vehicle is currently traveling.

For example, when the vehicle is in a turning state, the road surface μ estimator 202 may estimate a road surface μ based on a correlation among a vehicle speed, an actual yaw rate, and a steering force (a self-aligning torque) acquired from the electric power steering control unit 30.

Figure 7:
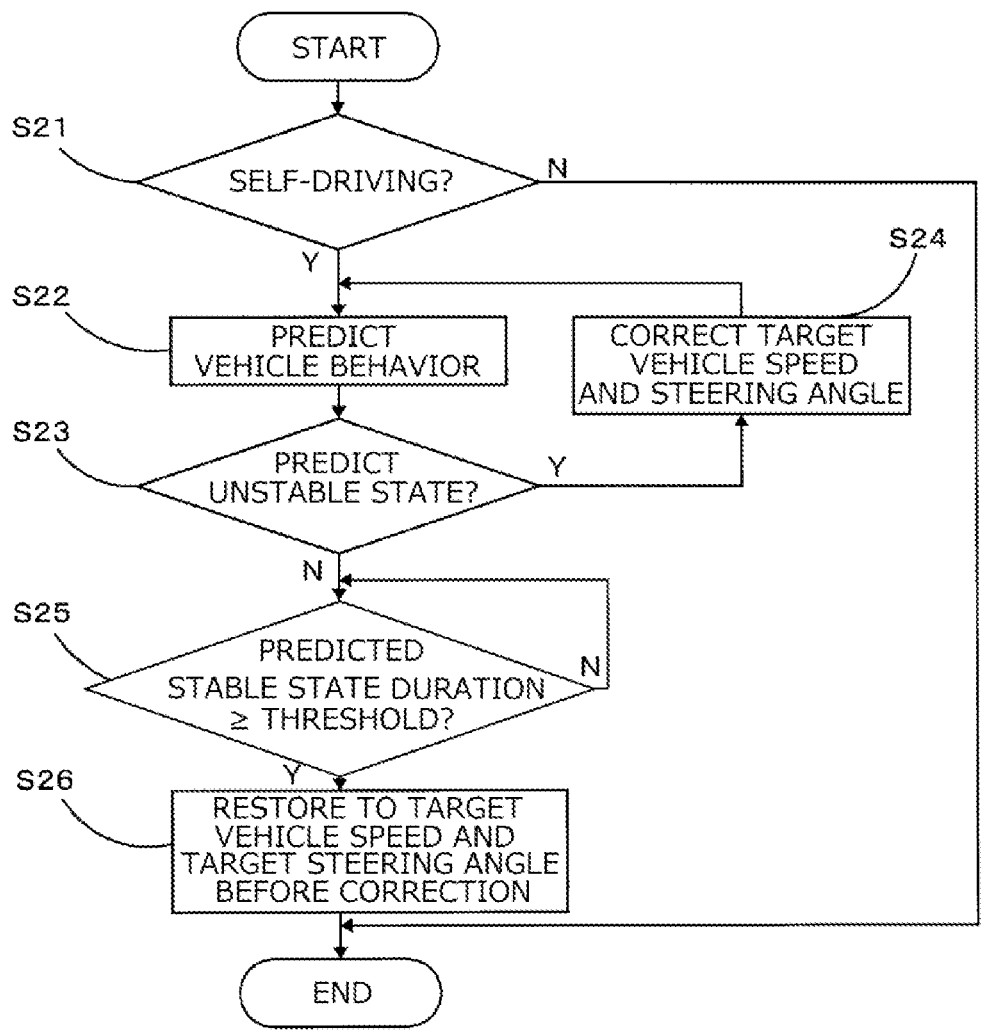
FIG. 7 is a flowchart illustrating operation of the vehicle control device according to the third embodiment.

FIG. 7 is a flowchart illustrating operation of the vehicle control device according to the third embodiment.

Hereinafter, steps will be sequentially described.

(Step S21: Determine Self-Driving)

The self-driving control unit 100 determines whether the host vehicle is currently driven under self-driving control.

When the vehicle is currently driven under the self-driving control, the vehicle control device 1 proceeds to step S22, otherwise ends a series of processes (that is, returns).

(Step S22: Predict Vehicle Behavior)

The model calculator 201 in the behavior prediction unit 200 predicts a behavior that the host vehicle may have in the future based on a shape of a road on which the host vehicle is currently travelling, an estimated road surface μ, a vehicle speed, and a steering angle.

When the target vehicle speed and the target steering angle are corrected in step S24, the vehicle speed and the steering angle after the correction are used in this calculation. When the target vehicle speed and the target steering angle are not corrected, an original target vehicle speed and an original target steering angle are used in this calculation.

Thereafter, the vehicle control device 1A proceeds to step S23.

(Step S23: Determine Behavior Prediction Result)

The behavior prediction unit 200 determines whether the vehicle behavior predicted in step S22 is in an unstable state (an oversteer behavior or an understeer behavior) in which a deviation between an actual yaw rate and a model yaw rate is equal to or larger than a predetermined stabilization determination threshold.

When the behavior prediction unit 200 predicts that the vehicle behavior is in an unstable state, the vehicle control device 1A proceeds to step S24. When the behavior prediction unit 200 does not predict that the vehicle behavior is in an unstable state (that is, when the behavior prediction unit 200 predicts that the vehicle behavior is in a stable state), the vehicle control device 1A proceeds to step S25.

(Step S24: Correct Target Vehicle Speed and Steering Angle)

The target vehicle speed setting unit 102 and the target steering angle setting unit 103 in the self-driving control unit 100 perform correction to reduce the target vehicle speed and the target steering angle during self-driving by a predetermined value relative to previous values, so that the vehicle is further stabilized.

Thereafter, the vehicle control device 1A returns to step S22 and repeats the subsequent processes.

(Step S25: Determine Predicted Stable State Duration)

The behavior prediction unit 200 determines whether it is predicted in the calculation results of the model calculator 201 that a vehicle stable state continues for predetermined duration or longer.

When the predicted duration of the stable state is equal to or larger than the threshold, the vehicle control device 1A proceeds to step S26, otherwise repeats step S25.

(Step S26: Restore to Target Vehicle Speed and Target Steering Angle Before Correction)

When the target vehicle speed and the target steering angle are corrected in step S24, the self-driving control unit 100 restores the target vehicle speed and the target steering angle to values before the correction.

Thereafter, the vehicle control device 1A ends the process.

According to the third embodiment, when a deviation between the actual yaw rate which is the index of the vehicle behavior that the vehicle may have in the future and the model yaw rate which is the index of the reference vehicle behavior increases, and it is predicted that the vehicle behavior may be in an unstable state, the target vehicle speed and the target steering angle during self-driving are corrected so as to stabilize the vehicle, to thereby prevent a state in which the vehicle behavior is in an unstable state from continuing.

Fourth Embodiment

Next, a vehicle control device according to a fourth embodiment of the disclosure will be described.

Instead of determining the stable state duration in the first embodiment (that is, step S09), the vehicle control device according to the fourth embodiment restores a target vehicle speed and a target steering angle during self-driving to values before the correction when it is determined that a turning state of the vehicle is completed.

The completion of a turning state may be determined based on, for example, (i) a result of recognizing a lane shape by the stereo camera device 51 and (ii) a collation result between a positioning result by the host vehicle position detection device 55 and map data read from the map data storage device 56.

According to the fourth embodiment, in addition to the effects of the first embodiment (except the effect described in item (4)), correcting the target vehicle speed and the target steering angle is completed in response to the completion of the turning state in which the vehicle is likely to be unstable, so that the vehicle speed or the like under the self-driving control can be restored and convenience of the vehicle can be improved.

Fifth Embodiment

Next, a vehicle control device according to a fifth embodiment of the disclosure will be described.

Instead of the actual yaw rate and the model yaw rate used for determining whether to correct the target vehicle speed and the target steering angle in the first embodiment, the vehicle control device according to the fifth embodiment uses an actually measured value and model value of a host vehicle position in a lateral direction in a lane of a road (a lateral position in the lane).

In the fifth embodiment, it is determined in the step S04 and the step S08 of the first embodiment that a vehicle is in an unstable state when a difference between the actual lateral position in the lane and the model value (that substantially matches a target locus set by the target locus setting unit 101 in the self-driving control unit 100) is equal to or larger than a predetermined value.

According to the fifth embodiment, in addition to the effects of the first embodiment (except the effect described in the item (2)), the disclosure can be easily applied without adding new hardware to existing vehicles, by using the lateral position in the lane which is a parameter generally used in a device for preventing a vehicle from deviating from a lane or a device for assisting a vehicle to keep a lane that is provided in common vehicles.

Modification

The disclosure is not limited to the embodiments described above. Various modifications and changes may be made. Such modifications and changes are also within the technical scope of the disclosure.

(1) Configurations of a vehicle and a vehicle control device are not limited to the above-described embodiments, and may be modified as appropriate.

(2) In each embodiment, an example of the vehicle is an automobile having an engine as a traveling power source. The disclosure is not limited thereto. The disclosure may be applied to an electric vehicle such as an engine hybrid electric vehicle (HEV), an electric vehicle (pure EV), or a fuel cell vehicle (FCV).

(3) The environment recognition unit is an example of a sensor used in recognizing environment in each embodiment, and may be modified as appropriate.

(4) In each embodiment, the yaw rate or the lateral position in the lane are used as an index of a vehicle behavior. Other indices may be used.

(5) In each embodiment, the behavior stabilization control uses a difference in braking force between the turning inner wheel and the turning outer wheel to restore a vehicle behavior from an unstable behavior. A method for restoration from an unstable behavior is not limited thereto, and may be modified as appropriate.

For example, when the vehicle has a torque vectoring function of generating a difference in driving force between a left drive wheel and a right drive wheel, the restoration from an unstable behavior may use the driving force difference.

Both the difference in braking force and the difference in driving force may be used.

The restoration from an unstable behavior may use steering angle control of a steering system together with braking or driving force difference control. For example, counter steer control may be performed when an oversteer behavior occurs.

According to the embodiments of the disclosure, when the deviation between the index of the actual vehicle behavior and the index of the reference vehicle behavior increases and it is recognized that the vehicle is in an unstable state, at least one of the target vehicle speed or the target steering angle during self-driving is corrected so as to stabilize the vehicle, so that a vehicle behavior can be prevented from continuing to be in an unstable state.

For example, both the target vehicle speed and the target steering angle may be reduced.

The disclosure may be easily applied without adding new hardware to existing vehicles by using a parameter generally used in a behavior control device provided in common vehicles.

The disclosure may be easily applied without adding new hardware to existing vehicles by using a parameter generally used in a device for preventing a vehicle from deviating from a lane or a device for assisting a vehicle to keep a lane that is provided in common vehicles.

The target vehicle speed and the target steering angle are corrected after the behavior stabilization control intervenes at least once, so that the passenger can intuitively recognize that the vehicle behavior may become unstable when no correction is performed.

The vehicle behavior can be predicted with good accuracy by the numerical analysis using the vehicle model.

When the deviation between an index of a vehicle behavior that may occur in the future and the index of the reference vehicle behavior increases and it is predicted that the vehicle may become unstable, at least one of the target vehicle speed or the target steering angle during self-driving is corrected so as to stabilize the vehicle. Thereby, the vehicle behavior can be prevented from being in an unstable state, in advance.

Correcting the target vehicle speed and the target steering angle is completed in response to the completion of the turning state in which the vehicle is likely to be unstable, so that the vehicle speed or the like during self-driving control can be restored and the convenience of the vehicle can be improved.

When the vehicle is in a stable state for a predetermined period, the vehicle speed or the like during self-driving control can be restored by completing the correction on the target vehicle speed and the target steering angle, and the convenience of the vehicle can be improved.

The target vehicle speed and the target steering angle are slowly restored to a state before the correction, so that the vehicle can be prevented from becoming unstable again due to acceleration, and the passenger can be prevented from feeling unsafe.

The embodiments of the disclosure as described above provide the vehicle control devices that can prevent the vehicle behavior from continuing to be in an unstable state during self-driving.

The invention claimed is:

1. A vehicle control device to be installed in a vehicle, the vehicle control device comprising:
   a self-driving controller configured to
     set a target vehicle speed and a target steering angle to allow the vehicle to trace a predetermined target travel locus, and
     control the vehicle based on the target vehicle speed and the target steering angle;
   a calculator configured to calculate a deviation between an index of an actual vehicle behavior and an index of a reference vehicle behavior; and
   a detector configured to detect a turning state of the vehicle,
   wherein the self-driving controller corrects one or both of the target vehicle speed and the target steering angle in accordance with an increase of the deviation, so as to stabilize the vehicle,
   wherein the self-driving controller completes the correction in accordance with completion of the turning state, and
   wherein when completing the correction, the self-driving controller restores one or both of the target vehicle speed and the target steering angle to a value before the correction, using a low change speed relative to speed in normal time.

2. The vehicle control device according to claim 1, wherein the calculator
   sets, as the index of the reference vehicle behavior, a yaw rate calculated based on the target vehicle speed and the target steering angle, and
   sets an actual yaw rate of the vehicle as the index of the actual vehicle behavior.

3. The vehicle control device according to claim 2, further comprising:
   a behavior controller configured to, upon detection of understeer behavior or oversteer behavior of the vehicle, perform behavior stabilization control to generate a difference in braking or driving force between a left wheel and a right wheel so as to generate a yaw moment to eliminate the understeer behavior or the oversteer behavior of the vehicle, wherein
   the self-driving controller performs the correction after the behavior controller performs the behavior stabilization control.

4. The vehicle control device according to claim 3, wherein when a state in which the deviation is equal to or less than a predetermined value lasts for a predetermined period or longer after the correction is performed, the self-driving controller completes the correction.

5. The vehicle control device according to claim 1, wherein the calculator
sets, as the index of the reference vehicle behavior, a position of the vehicle in a lane width direction that is estimated based on the target travel locus, and
sets, as the index of the actual vehicle behavior, an actual position of the vehicle in the lane width direction.

6. The vehicle control device according to claim 5, further comprising:
a behavior controller configured to, upon detection of understeer behavior or oversteer behavior of the vehicle, perform behavior stabilization control to generate a difference in braking or driving force between a left wheel and a right wheel so as to generate a yaw moment to eliminate the understeer behavior or the oversteer behavior of the vehicle, wherein
the self-driving controller performs the correction after the behavior controller performs the behavior stabilization control.

7. The vehicle control device according to claim 1, further comprising:
a behavior controller configured to, upon detection of understeer behavior or oversteer behavior of the vehicle, perform behavior stabilization control to generate a difference in braking or driving force between a left wheel and a right wheel so as to generate a yaw moment to eliminate the understeer behavior or the oversteer behavior of the vehicle, wherein
the self-driving controller performs the correction after the behavior controller performs the behavior stabilization control.

8. The vehicle control device according to claim 1, wherein when a state in which the deviation is equal to or less than a predetermined value lasts for a predetermined period or longer after the correction is performed, the self-driving controller completes the correction.

9. A vehicle control device to be installed in a vehicle, the vehicle control device comprising:
a self-driving controller configured to
set a target vehicle speed and a target steering angle to allow the vehicle to trace a predetermined target travel locus, and
control the vehicle based on the target vehicle speed and the target steering angle;
a predictor configured to predict a vehicle behavior;
a calculator configured to calculate a deviation between an index of the predicted vehicle behavior and an index of a reference vehicle behavior; and
a detector configured to detect a turning state of the vehicle,
wherein the self-driving controller corrects one or both of the target vehicle speed and the target steering angle in accordance with an increase of the deviation, so as to stabilize the vehicle, and
wherein when completing the correction, the self-driving controller restores one or both of the target vehicle speed and the target steering angle to a value before the correction, using a low change speed relative to speed in normal time.

10. The vehicle control device according to claim 9, wherein the predictor predicts the vehicle behavior using a vehicle model of the vehicle, data of a road shape on which the vehicle travels, and an estimated friction coefficient of a road surface.

11. A vehicle control device to be installed in a vehicle, the vehicle control device comprising:
a self-driving controller configured to
set a first target vehicle speed and a first target steering angle to allow the vehicle to trace a predetermined target travel locus, and
perform a first self-driving control to control the vehicle based on the first target vehicle speed and the first target steering angle;
a calculator configured to calculate a deviation between an index of an actual vehicle behavior of the vehicle and an index of a reference vehicle behavior of the vehicle; and
a behavior controller configured to, upon detection of understeer behavior or oversteer behavior of the vehicle based on the calculated deviation, perform behavior stabilization control to generate a yaw moment to prevent the detected oversteer behavior or understeer behavior of the vehicle from continuing,
wherein the self-driving controller is further configured to
when the behavior controller completes the behavior stabilization control during the first self-driving control, seta second target vehicle speed and a second target steering,
perform a second self-driving control to control the vehicle based on the second target vehicle speed and the second target steering angle so that the vehicle continues to trace the predetermined target travel locus from a first timing at which the behavior stabilization control completes to a second timing at which the calculated deviation is determined to be equal to or less than a predetermined first threshold for a predetermined period, and
upon determining that the calculated deviation is equal to or less than the predetermined first threshold for the predetermined period, resume the first self-driving control,
wherein the self-driving controller i) sets the second target vehicle speed to be lower than the first target vehicle speed and to be equal to or lower than an actual vehicle speed at the first timing based on the predetermined target travel locus and ii) sets the second target steering angle based on the predetermined target travel locus and the second target vehicle speed,
set the second target vehicle speed to be equal to the actual vehicle speed at the first timing, 1) when an absolute value of the deviation at the first timing is greater than a predetermined second threshold and a gradient of change of the absolute value of the deviation at the first timing is less than a predetermined negative third threshold, or 2) when the absolute value of the deviation at the first timing is equal to or less than the predetermined second threshold and the gradient of change of the absolute value of the deviation at the first timing is equal to or greater than the predetermined negative third threshold and is equal to or less than a predetermined positive fourth threshold, and
set the second target vehicle speed lower than the actual vehicle speed at the first time point, 1) when the absolute value of the deviation at the first timing is greater than the predetermined second threshold and the gradient of change of the absolute value of the deviation at the first timing is equal to or greater than the predetermined negative third threshold, or 2) when the absolute value of the deviation at the first timing is equal to or less than the predetermined second threshold and the gradient of change of the absolute value of the deviation at the first timing is less than the predetermined negative third threshold or is greater than the predetermined positive fourth threshold.

12. The vehicle control device according to claim 11, wherein the calculator
   sets, as the index of the reference vehicle behavior, a yaw rate calculated based on the first target vehicle speed and the first target steering angle, and
   sets an actual yaw rate of the vehicle as the index of the actual vehicle behavior.

13. The vehicle control device according to claim 11, wherein the behavior controller configured to perform the behavior stabilization control to generate a difference in braking or driving force between a left wheel and a right wheel so as to generate the yaw moment to eliminate the understeer behavior or the oversteer behavior of the vehicle.

* * * * *